United States Patent
Oakey et al.

(10) Patent No.: US 7,155,082 B2
(45) Date of Patent: Dec. 26, 2006

(54) SWITCHABLE MICROFLUIDIC OPTICAL WAVEGUIDES

(75) Inventors: John Oakey, Boulder, CO (US); David W. M. Marr, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 10/907,695

(22) Filed: Apr. 12, 2005

(65) Prior Publication Data

US 2005/0226549 A1   Oct. 13, 2005

Related U.S. Application Data (60) Provisional application No. 60/521,372, filed on Apr. 12, 2004.

(51) Int. Cl.
*G02B 6/26* (2006.01)

(52) U.S. Cl. .......................................... 385/16; 385/14

(58) Field of Classification Search ................. 385/14, 385/16–23
See application file for complete search history.

(56) References Cited

U.S. PATENT DOCUMENTS

| | | | | |
|---|---|---|---|---|
| 4,201,446 | A | * | 5/1980 | Geddes et al. ............... 385/125 |
| 5,444,807 | A | * | 8/1995 | Liu .............................. 385/125 |
| 5,600,433 | A | * | 2/1997 | Buttry et al. ................. 356/128 |
| 5,932,100 | A | * | 8/1999 | Yager et al. .................. 210/634 |
| 6,159,739 | A | | 12/2000 | Weigl et al. |
| 6,470,107 | B1 | | 10/2002 | Brockett et al. |

(Continued)

FOREIGN PATENT DOCUMENTS

| | | |
|---|---|---|
| WO | WO-02/069016 A2 | 9/2002 |
| WO | WO-02/088686 A1 | 11/2002 |
| WO | WO-03/035386 A1 | 5/2003 |

OTHER PUBLICATIONS

D.V. Vezenov, B.T. Mayers, D.B. Wolfe, and G.M. Whitesides, "Integrated Fluorescent Light Source for Optofluidic Applications," *Applied Physics Letters*, Jan. 24, 2005, article 041104 (3 pgs) vol. 86, iss. 4, American Institute of Physics, US.

(Continued)

*Primary Examiner*—Kevin S. Wood
(74) *Attorney, Agent, or Firm*—Holland & Hart LLP; Kenneth C. Winterton (57) ABSTRACT

The present invention provides microfluidic optical waveguides and waveguide switches providing capability for multiple outlet paths for the fluid waveguides and optical signals contained therein. A microfluidic structure comprises a core inlet channel, one or more cladding fluid inlet channels intersecting with the core inlet channel downstream of a core inlet, and at least two outlet channels coupled to the core inlet channel and downstream of the cladding fluid channel. An optical source providing an optical signal is aligned with the core inlet channel. A waveguiding fluid is supplied to the core inlet channel and a cladding fluid supplied to each of the cladding channels. The waveguiding fluid and cladding fluid form an optical waveguide operable to transmit the optical signal. The flow rate of the cladding fluid is selectable to switch the optical waveguide between at least the first and second outlet channels.

19 Claims, 6 Drawing Sheets

U.S. PATENT DOCUMENTS

| | | | |
|---|---|---|---|
| 2001/0055546 A1* | 12/2001 | Weigl et al. | 422/100 |
| 2002/0182747 A1* | 12/2002 | Beebe et al. | 436/180 |
| 2003/0012483 A1 | 1/2003 | Ticknor et al. | |
| 2003/0161572 A1 | 8/2003 | Johnck et al. | |
| 2003/0201022 A1* | 10/2003 | Kawai et al. | 137/828 |
| 2005/0068536 A1* | 3/2005 | Schwabe | 356/436 |
| 2006/0108012 A1* | 5/2006 | Barrow et al. | 137/806 |

OTHER PUBLICATIONS

K. Campbell, A. Groisman, U. Levy, L. Pang, S. Mookherjea, D. Psaltis, and Y. Fainman, "A Microfluidic 2×2 Optical Switch," *Applied Physics Letters*, Dec. 20, 2004, pp. 6119-6121, vol. 85, iss. 25, American Institute of Physics, US.

D.B. Wolfe, R.S. Conroy, P. Garstecki, B.T. Mayers, M.A. Fischbach, K.E. Paul, M. Prentiss, and G.M. Whitesides, "Dynamic Control of Liquid-core/Liquid-cladding Optical Waveguides," *PNAS*, Aug. 24, 2004, pp. 12434-12438, vol. 101, No. 34, National Academy of Sciences, US.

* cited by examiner

SWITCHABLE MICROFLUIDIC OPTICAL WAVEGUIDES

CROSS REFERENCE TO RELATED APPLICATIONS

This application claims the benefit of U.S. Provisional Patent Application No. 60/521,372, filed on Apr. 12, 2004, entitled "SWITCHABLE OPTICAL WAVEGUIDE VIA MICROFLUIDIC FLOWS", the entire disclosure of which is hereby incorporated by reference.

FIELD OF THE INVENTION

The present invention is related to microfluidic devices, and more particularly, to optical waveguides in microfluidic devices.

BACKGROUND OF THE INVENTION

Optical waveguiding is an important technology, forming the foundation of many modern communications and information transport systems. Traditionally, optical waveguides used in such systems include glass-based optical fibers, such as fiber optic lines. An important ability in optical waveguide technology is the ability to switch an optical signal between different optical fibers thus switching the optical signal from one output to another, creating an optical switch. While useful in many systems, such as telecommunications and information transport systems, such optical fibers are difficult to integrate into microscopic networks.

Microfluidic systems is an area of expanding technology experiencing growth and an expanding range of applications, as systems of increasing capability are developed. With the growing complexity of many microfluidic devices, information densities have also increased and the need to transport signals and data across such devices is becoming more important.

SUMMARY OF THE INVENTION

The present invention has recognized that incorporating fluid waveguides into microfluidic structures can provide an efficient and relatively easily fabricated data communication means. The present invention provides microfluidic optical waveguides and waveguide switches providing capability for multiple outlet paths for the fluid waveguides and optical signals contained therein.

In one embodiment, the present invention provides a switchable microfluidic optical waveguide, comprising: (a) a microfluidic structure comprising: (i) a core inlet channel; (ii) at least two downstream inlet channels downstream of a core inlet, including first and second cladding channels, intersecting with the core inlet channel; (iii) at least first and second outlet channels coupled to the core inlet channel and downstream of the downstream inlet channels; (b) an optical source providing an optical signal aligned with the core inlet channel; (c) a waveguiding fluid supplied to the core inlet channel at an inlet flow rate; and (d) a cladding fluid supplied to each of the cladding channels. The waveguiding fluid and cladding fluid form an optical waveguide operable to transmit the optical signal. The cladding fluid is supplied to the first cladding channel at a first cladding flow rate and to the second cladding channel at a second cladding flow rate. The first and second cladding flow rates are selectable to switch the optical waveguide between at least the first and second output channels. In one embodiment, the waveguiding fluid has a higher index of refraction than the cladding fluid. In another embodiment, the waveguiding fluid has a higher viscosity than the cladding fluid. The microfluidic structure may comprise poly(dimethylsiloxane) (PDMS).

DETAILED DESCRIPTION

The present invention recognizes that direct integration of waveguides formed of current glass-based optical fiber technologies into microfluidic networks is a significant fabrication challenge. As is known in the art, microfluidic systems are systems that employ fluid channels and chambers having dimensions of tens to hundreds of micrometers and that provide volumetric flow rates as low as nanoliters or picoliters per minute and as high as or in excess of microliters per minute. Previous approaches to micro-scale waveguiding have used direct incorporation of such optical fibers in silicon substrates. Although such studies have shown feasibility, alignment during incorporation can be difficult and it is either not possible or a significant challenge to scale these technologies down to smaller length scales. Other approaches have used static fluid channel waveguides. In such systems, a channel is filled with fluid with a higher index of refraction relative to the channel substrate, thus allowing for a waveguide to be formed in the channel. While such devices work as waveguides, the waveguides are static and thus not able to accommodate changing the waveguide from one microfluidic channel to another. The present invention provides a microfluidic system capable of creating a fluid waveguide or other hybrid micro-optical device. Such devices are readily scalable and provide not only easily fabricated and integrated waveguides, but also a method of switching or reconfiguring micro-optical networks through any microfluidic pumping technique. The liquid waveguide takes advantage of the laminar nature of microfluidic flows to direct a high refractive index waveguiding, or core, fluid within a lower refractive index "cladding" fluid. Furthermore, volumetric flow rates of the cladding fluids may be adjusted in order to direct the core fluid through desired outlet channels, thus creating a switchable optical waveguide.

Figure 1:
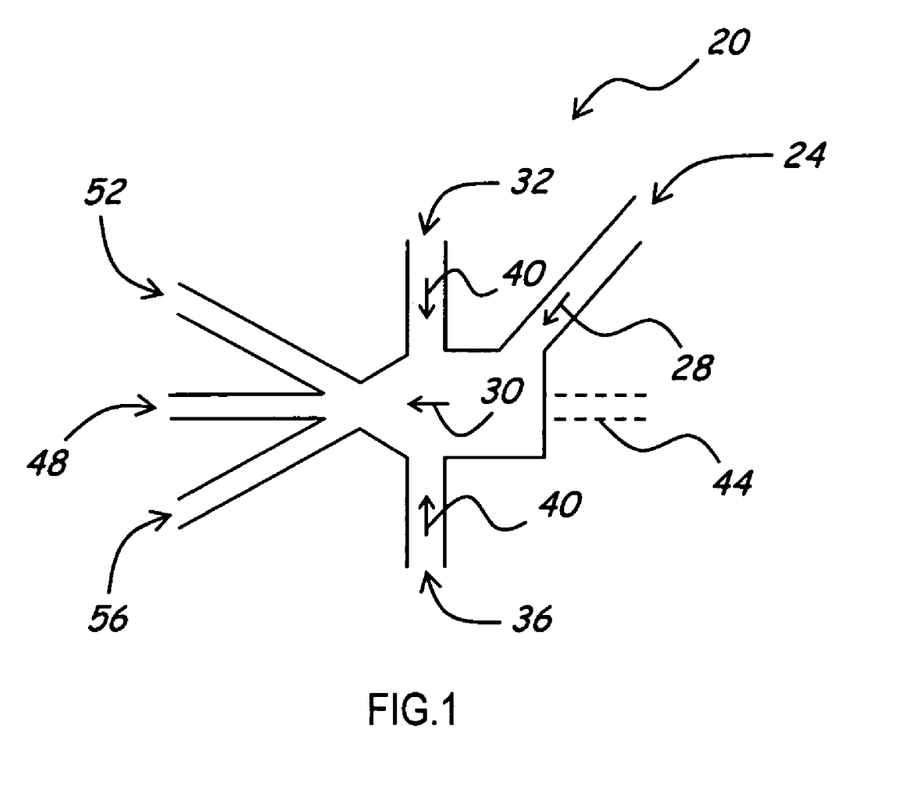
FIG. 1 is a schematic illustration of a switchable microfluidic optical waveguide of an embodiment of the invention.

Referring now to FIG. 1, a simple switch 20 is described for an embodiment of the invention. In this embodiment, a core inlet 24 receives a waveguiding fluid 28 that flows into a core flow stream 30 within the switch 20. A first side inlet 32 and a second side inlet 36 receive cladding fluid 40 that converges upon the core flow stream 30, resulting in a pinching or hydrodynamic focusing of the core flow stream 30 of the waveguiding fluid 28. For a given geometry of the microfluidic channels forming the switch 20, the width and position of the core flow stream 30 are a function of the relative volumetric flow rates of fluid entering the three inlets 24, 32, and 36. An optical signal 44, originating from any suitable optical source (not shown) such as a laser, is positioned to be in alignment with the center core flow 30, and this optical signal is transmitted through the waveguide created by the streams. The optical signal 44 may be directed to precise locations, and may be reconfigured in a dynamic fashion by adjusting the volumetric flow rate of the cladding fluid 40 into the first and/or second side inlets 32, 36. FIG. 1 illustrates three outlet streams 48, 52, 56, into which the waveguide may be directed by adjusting the flow rate at the side inlets 32, 36.

A waveguide of the embodiment of FIG. 1 is formed having one fluid, the core flow stream 30, sheathed by two streams of cladding fluid 40 of different refractive index, thus creating a fluid-fluid waveguide that may be dynamically manipulated. In one embodiment, the refractive index of the cladding fluid 40 is about 1.33, and the refractive index of the waveguiding fluid 28 is about 1.46. This embodiment provides a contrast that is significantly higher than traditional glass-glass optical fibers. However, it will be understood that these values may be adjusted from these numbers to provide an operable waveguide for a particular application. The fluids themselves may be aqueous (water-based) or organics (oil-based), and any combination (water-oil-water, water-water-water, oil-oil-oil, oil-water-oil) may be used. In one embodiment, a water/sucrose solution is used for the core flow stream 30 and water is used for the cladding fluid 40, although other solutions may be used so long as a suitable difference in refractive indices between the core fluid 28 and cladding fluid 40 is maintained, thus creating optical contrast between the core 30 and cladding 40 streams.

In the embodiment utilizing the sucrose/water mixture as the core fluid 28 and water as the cladding fluid 40, a significant viscosity increase is measured for the core fluid 28 relative to the cladding fluid 40. Multicomponent flows of differing viscosity are used in some embodiments due to their intrinsic behavior relative to the interface between the flows. In one embodiment, the lower viscosity cladding, or sheath, flow lubricates the higher viscosity core fluid. The core fluid may be completely surrounded by the cladding flow. The resulting waveguide generated by the flow streams has little or no interaction with the wall at the sides or at the top/bottom of the channel. Instead, the interface of the waveguide is uniform and therefore the refractive index contrast of the waveguide is uniform. This allows for different waveguiding performance over embodiments where the flows have similar viscosity by, for example, accommodating sharper turns. Thus, the waveguiding performance may be selected based on the application and the required angles at which it is desired to turn waveguides for the particular application. The turning radius of the waveguiding core fluid 28 is related to the critical angle defined by Snell's Law:

$$\theta_{critical} = \sin^{-1}(n_1/n_2)$$

where $n_1$ and $n_2$ are the refractive index of the cladding 40 and core 28 fluids respectively. In one of the above-described embodiments that utilizes a water/sucrose mixture as the waveguiding core fluid 28, because of solute diffusion (the sugar in the core fluid), index of refraction will vary from the center of the core stream 28 to the cladding interface, where it will be slightly lower. In glass fiber, this is done purposefully to create "graded-index" fibers that better transport optical signals (both single and multimode fibers) compared to non-graded-index fibers. Such "graded-index" fluid streams will have a smaller critical radius of curvature than predicted by Snell's law as a result. In situations where minimal diffusion is expected to occur, such as in the use of immiscible liquids or very short waveguiding lengths, the fluidic waveguide will mimic "step-index" optical fibers instead.

In general, any set of operating conditions may be used, including flow rates of the different fluids and channel geometry. For example, in embodiments such as illustrated in FIG. 1, in which three inlet and one outlet channel intersect, the angle at which they intersect has no impact on the formation of the waveguide. The relative channel widths and depths are also largely irrelevant. For convenience, flow networks of a uniform depth and an outlet channel with an aspect ratio (depth/width) of much less than 1 are used in some embodiments. Absolute flow rates also have relatively little impact on waveguide properties. In one embodiment, the waveguiding fluid 28 is provided to the core inlet 24 at volumetric flow rates of about $1 \times 10^{-6}$ liters/minute, and the relative flow rates of the cladding fluid 40 provided to the side inlets 32, 36 are selected to provide the waveguide width and output to a desired outlet.

In one embodiment, the microfluidic channels are fabricated in poly(dimethylsiloxane) (PDMS). Such PDMS microfluidic structures are known in the art, and are commonly fabricated using soft lithography techniques allowing microfluidic networks to be quickly replicated from a permanent, re-useable master with fidelity in the order of single nanometers and feature sizes less than one hundred nanometers. The networks are created by first transferring the pattern of a shadow mask onto a negative photo-resist film (in one embodiment SU-850, Micro-Chem Corp. Newton, Mass.) spun upon a silicon wafer to a depth of approximately 80 microns. A two-part mixture of PDMS (in an embodiment, Slygard 184, Dow Chemical, Midland, Mich.) is then poured and cured upon the silicon master to produce an optically transparent replica. This PDMS channel network is then sealed to a second flat PDMS membrane coupled to create the microfluidic channels. However, such microfluidic structures may be formed from various other materials. For example, such microfluidic structures may be fabricated from plexiglass, polycarbonate, glass, and silicon, to name but a few. In embodiments in which the cladding fluid does not completely surround the core fluid, the composition of the material used to fabricate the microfluidic structures may be selected such that the refractive index of the material is lower than the refractive index of the core fluid, thereby creating a waveguiding effect between the core fluid and the top/bottom channel walls. In embodiments where the cladding fluid does completely surround the core fluid the composition of the material used to fabricate the microfluidic structures is not critical to the operation of the invention.

Figure 2A:
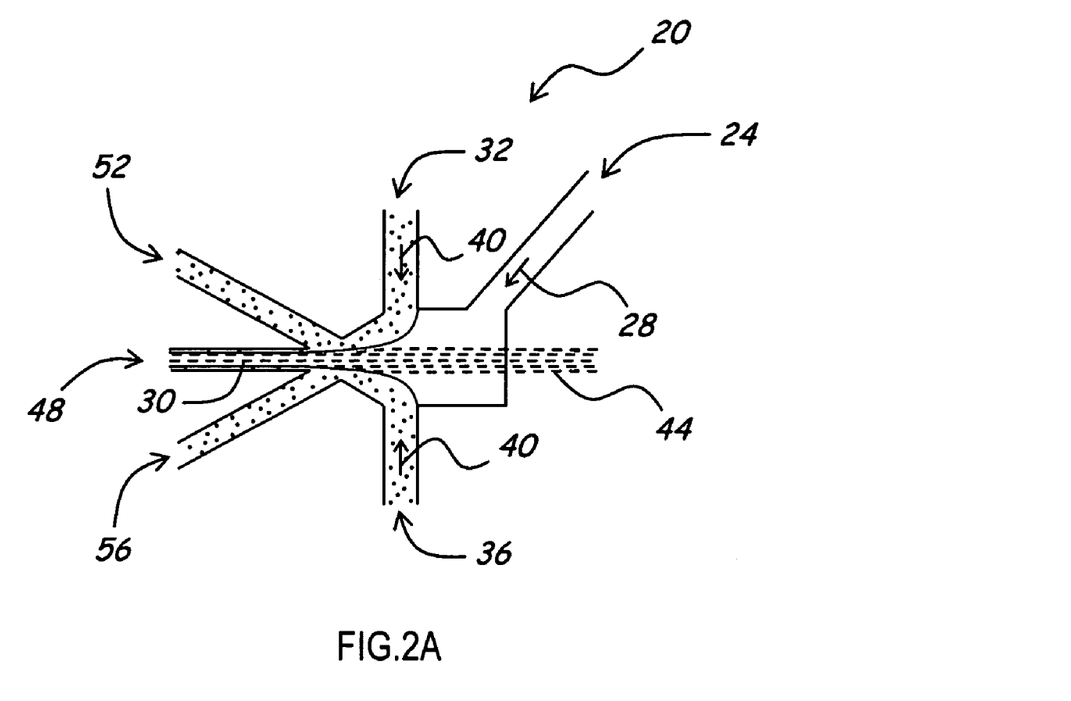
FIG. 2A is an illustration of a microfluidic optical waveguide switch of an embodiment of the invention in which an optical signal is output from a first channel.
Figure 2B:
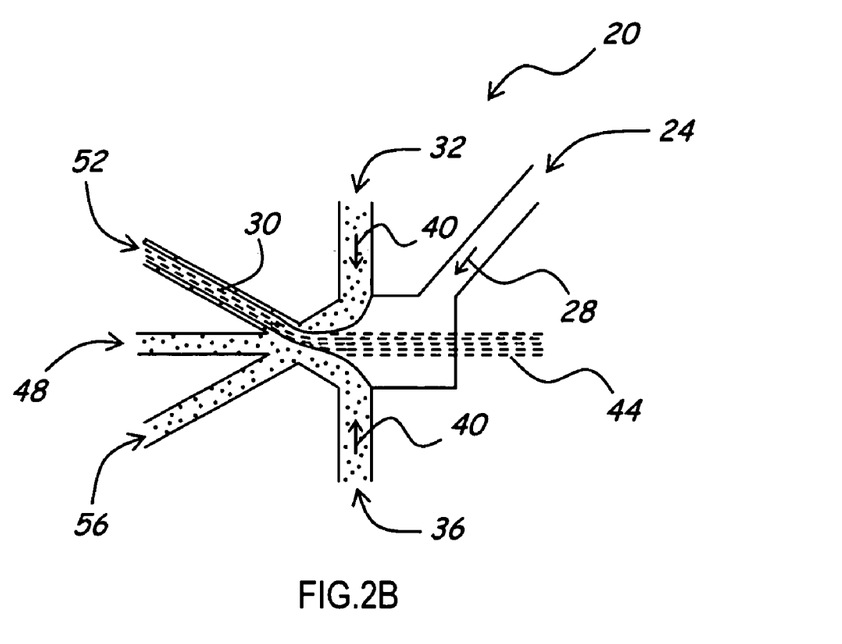
FIG. 2B is an illustration of a microfluidic optical waveguide switch in which the optical signal is switched to a second channel.
Figure 2C:
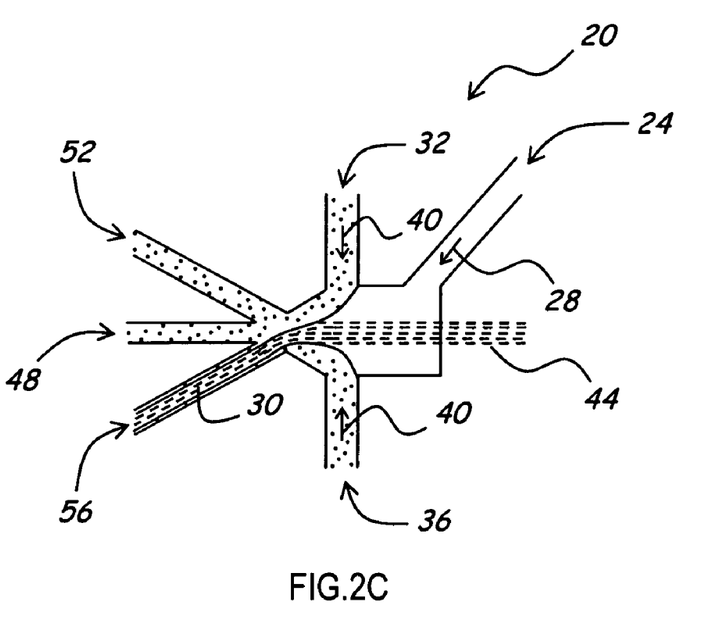
FIG. 2C is an illustration of a microfluidic optical waveguide switch in which the optical signal is switched to a third channel.

Referring now to FIGS. 2A–2C, an illustration of an optical switch of an embodiment is now described. Initially, with reference to FIG. 2A, the core flow stream 30 is routed down the first outlet channel 48. Cladding fluid 40 from inlet streams 32, 36 is provided at relatively equal volumetric flow rates resulting in the core flow stream 30 flowing down the first outlet 48. The optical signal 44 is provided in alignment with the core waveguiding inlet stream, illustrated by the dashed lines of FIG. 2, and is directed down the first outlet channel 48. FIG. 2B illustrates the core flow stream 30 directed to a second outlet channel 52. The core flow stream 30 is directed to this channel by adjusting the volumetric flow rates of the cladding fluid 40 in one or both of the side inlet channels 32, 36. In one embodiment, the volumetric flow rate in the first side channel 32 is reduced while the volumetric flow rate into the second side channel 36 is increased, resulting in a deflection of the core flow stream 30 into the second outlet channel 52 as illustrated. The angle of the second outlet channel 52 relative to the optical signal 44 is at an angle of curvature that is greater than the critical angle formed by the fluidic waveguide, resulting in the optical signal 44 from the optical source being directed down the second outlet channel 52. Thus, the optical signal 44 from the optical source is switched to the second outlet channel 52 in this example. Referring now to FIG. 2C, the core flow stream 30 is switched to the third outlet channel 56 in a similar manner as described with respect to FIG. 2B. Similarly as described above, this may be accomplished by adjusting the volumetric flow rates of the two side inlet channels 32, 36 and, in one embodiment, is accomplished by reducing the volumetric flow rate of the cladding fluid 40 provided to the second inlet channel 36 while increasing the volumetric flow rates into the first inlet channel 32. The optical signal 44 from the optical source is directed through to the third outlet channel 56 in a manner similarly as described with respect to FIG. 2B.

Figure 3:
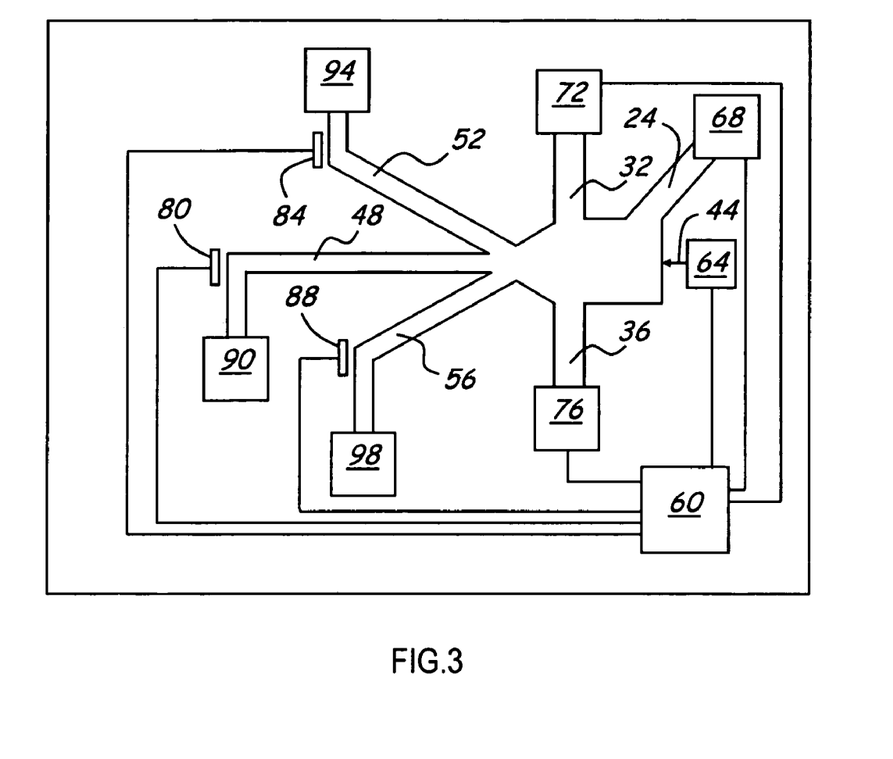
FIG. 3 is a schematic illustration of a switchable microfluidic optical waveguide system of an embodiment of the invention.

Referring now to FIG. 3, an embodiment of the invention is described in which various components of a microfluidic system are illustrated. In this embodiment, microfluidic channels are present as described with respect to FIGS. 1 and 2, although it will be understood that this configuration is for purposes of discussion and illustration only, and that other configurations may be used. In this embodiment, a controller 60 controls various other components and receives input from various other components. The controller 60 can communicate with an optical source 64 that provides the optical signal 44 into the device, and may turn the optical source 64 on/off. The optical source 64, in an embodiment, is a laser, although any type of optical source 64 may be used that provides a coherent or non-coherent optical signal. Fluid pumps 68, 72, and 76 are coupled to the controller 60, with the controller capable of controlling the rate at which one or more of the pumps 68–72 provide fluid to its respective channel. This thus generates desired flows into the respective inlet channels and provides the capability to switch the outlet for a core fluid as described above. The pumps may be of any type that are used for supplying and controlling flow of fluid in microfluidic channel.

The controller, in this embodiment, also receives input from optical detectors 80, 84, 88 positioned in proximity to the outlet channels 48–56. The optical detectors 80–88 may be any suitable detector capable of receiving the optical signal 44 and generating a signal in response thereto. The outlet channels 48–56 turn at an angle greater than the critical radius, thus resulting in the optical signal 44 exiting the waveguide. The optical detectors 80–88 are positioned in proximity to the respective outlet channels to receive the optical signal. While it is illustrated in FIG. 3 that the optical detectors 80–88 provide a signal to the controller 60, other embodiments may have fewer optical detectors than output channels and even no optical detectors. Furthermore, the output from the optical detector may be provided to another component rather than the controller, with this other component collecting and using the signal. The controller, if it does receive one or more signals from optical detectors, may use such a signal as feedback to adjust the flow rate at one or more of the pumps.

Each of the outlet channels 48–56 illustrated in FIG. 3 have an associated outlet 90–98 where the fluid from the channel exits the outlet channel. In one embodiment, the outlets 90–98 are used to control the rate of liquid flow exiting the outlet channels 48–56, and thus may be used to shift the waveguide core fluid 30 between the different outlets. In this embodiment, the flow rate to the inlet channels 68–76 may be constant, with the flow rate at the outlets 90–98 determining the outlet channel 48–56 through which the core fluid 30 is carried. The flow rate at the outlets 90–98 may be controlled using any available microfluidic actuation technique including, for example, a force transducer that constricts the microfluidic channel. Furthermore, the outlet channels 48–56 may have pumps associated therewith that pull fluid through the system, and the fluid flow within the system may be directed to various outlet channels 48–56 as desired by adjusting the flow at the outlets and/or adjusting the inlet flows. In such embodiments, the controller 60 is also capable of communicating with the devices located at the outlet channel and providing control signals thereto for purposes of making adjustments.

Figure 4:
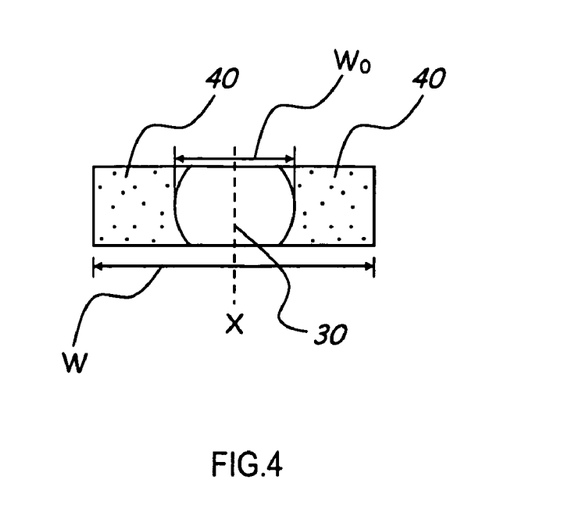
FIG. 4 is a cross-sectional illustration of the core liquid and cladding liquid for an embodiment for the invention.
Figure 5:
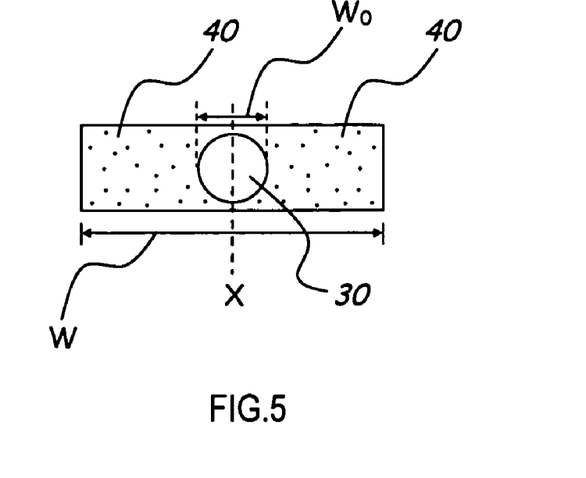
FIG. 5 is a cross-sectional illustration of the core liquid and cladding liquid for another embodiment for the invention.

Referring now to FIGS. 4 and 5, cross-sectional illustrations of two possible configurations of a microfluidic channel with center flow stream 30 and side flow streams of cladding fluid 40 are described. FIG. 4 illustrates a center flow 30 stream that interacts with the cladding fluid 40 and the top/bottom channel walls. An optical waveguide provided by such a flow may be used in a two-dimensional waveguide system. FIG. 5 illustrates a center flow 30 stream that is completely surrounded by the cladding fluid 40. An optical waveguide provided by such a flow may be used in a three-dimensional waveguide system. Relating to optical switching, it is generally important to understand how the position of the center flow stream 30 will respond to variations in the side flow rates of the side inlet channels 32, 36. The following equation describes an approximate center flow stream 30 position for an embodiment:

$$X/W_{total} = Q_{f2} - Q_{f1}/Q_{f2} + Q_i + Q_{f1}$$

where, x is the position of the middle of the center flow stream 30, w is the total channel width, Q is flow rate and the subscripts refer to the center (i) and side (f1,f2) streams. In addition to position, the side stream flow rates also dictate the width of the center stream ($w_o$):

$$\frac{w_o}{w} = \frac{Q_i}{Q_i + Q_f} = \left(1 + \frac{Q_f}{Q_i}\right)^{-1}$$

In the case where side streams are symmetrical the side stream flow rates are referred to simply as f.

Figure 6:
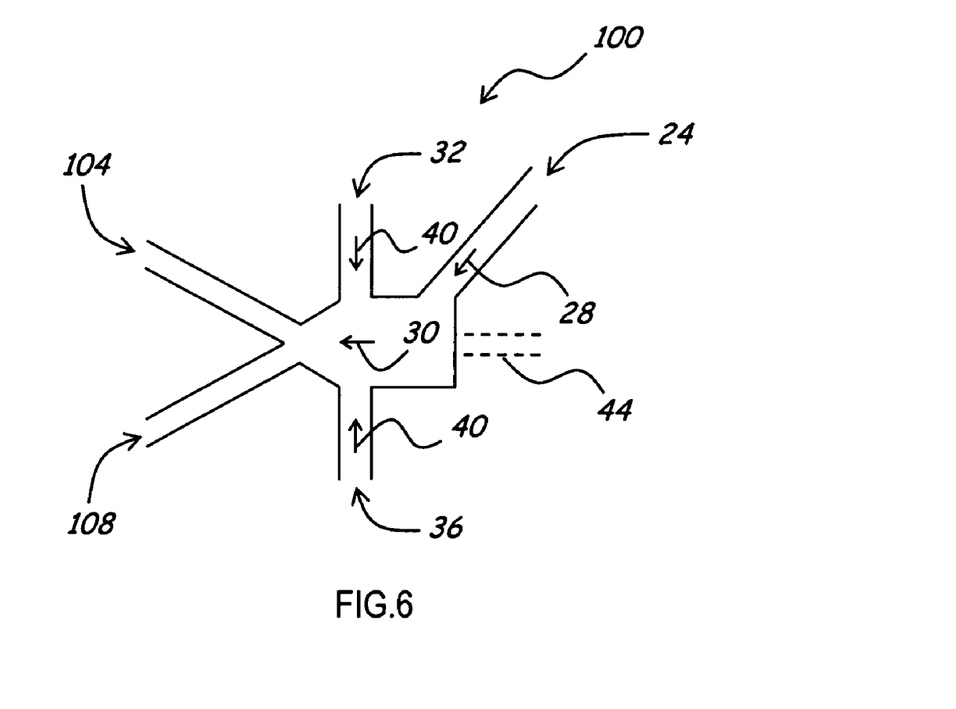
FIG. 6 is an illustration of a microfluidic optical switch of another embodiment of the invention.

Referring now to FIG. 6, another embodiment of the invention is illustrated. In this embodiment, a two-outlet switch 100 is illustrated. The switch 100 of this embodiment has a first outlet channel 104 and a second outlet channel 108. The core fluid stream 30 may be directed to either of the outlet channels 104, 108 by adjusting the flow rates of cladding fluid 40 into one or both of the side inlet channels 32, 36. The switch 100 operates in a similar manner as described with respect to the switch illustrated in the embodiments of FIGS. 1 and 2. As will be appreciated, numerous configurations for inlet channels and outlet channels are possible. For example, four or more outlet channels may be present in both two-dimensions and three-dimensions. The inlet channels, and relative volumetric flow rates may be adjusted to direct a core flow stream and waveguiding fluid to any of the desired outlet channels. Furthermore, additional inlet channels may be provided that are used to direct the core flow stream as desired. For example, cladding fluid may be provided at relatively equal flow rates to two side inlet channels in order to provide the fluid waveguide. Two or more additional side inlet channels may be provided downstream of the first side inlet channels and may be used to provide fluid to the channels at appropriate volumetric flow rates to direct the flow of the core flow stream as desired. In another embodiment, a single side inlet channel may be provided. In such a case, the channel wall provides a waveguide boundary with the core flow stream traveling in a neutral position to a desired outlet channel, and cladding fluid may be provided to the side inlet channel that both provides an opposing waveguide boundary as well as directing the core flow stream to a second outlet channel.

While the invention has been particularly shown and described with reference to embodiments thereof, it will be understood by those skilled in the art that various other changes in the form and details may be made without departing from the spirit and scope of the invention.

What is claimed is:

1. A switchable microfluidic optical waveguide, comprising:
    a microfluidic structure comprising:
    a core inlet channel;
    at least two downstream inlet channels downstream of a core inlet, including first and second cladding channels, intersecting with said core inlet channel;
    at least first and second outlet channels coupled to said core inlet channel and downstream of said downstream inlet channels;
    an optical source providing an optical signal aligned with said core inlet channel;
    a waveguiding fluid supplied to said core inlet at an inlet flow rate;
    a cladding fluid supplied to each of said cladding channels wherein said waveguiding fluid and cladding fluid form an optical waveguide operable to transmit said optical signal, said cladding fluid supplied to said first cladding channel at a first cladding flow rate and to said second cladding channel at a second cladding flow rate; and
    wherein said first and second cladding flow rates are selectable to switch said optical waveguide between at least said first and second output channels.

2. The switchable microfluidic optical waveguide, as claimed in claim 1, wherein said waveguiding fluid has a higher index of refraction than said cladding fluid.

3. The switchable microfluidic optical waveguide, as claimed in claim 1, wherein said waveguiding fluid has a higher viscosity than said cladding fluid.

4. The switchable microfluidic optical waveguide, as claimed in claim 3, wherein said waveguiding fluid is surrounded on all sides by said cladding fluid.

5. The switchable microfluidic optical waveguide, as claimed in claim 4, wherein optical waveguide is a graded-index optical waveguide.

6. The switchable microfluidic optical waveguide, as claimed in claim 1, wherein said microfluidic structure comprises poly(dimethylsiloxane) (PDMS).

7. The switchable microfluidic optical waveguide, as claimed in claim 1, wherein said cladding fluid is supplied to said first and second cladding channels by respective first and second pumps, and wherein said first and second pumps are operable to supply said cladding fluid at selectable flow rates.

8. The switchable microfluidic optical waveguide, as claimed in claim 7, further comprising:
    a controller operably interconnected with each of said pumps and operable to control the flow rates associated with each of said pumps.

9. The switchable microfluidic optical waveguide, as claimed in claim 1, further comprising an optical source aligned with said inlet channel and operable to generate an optical beam that is transmitted by said optical waveguide.

10. The switchable microfluidic optical waveguide, as claimed in claim 9, further comprising at least one optical detector associated with at least one of said outlet channels and operable to detect said optical beam.

11. A switchable microfluidic optical waveguide system, comprising:
    a microfluidic structure comprising:
    a core inlet channel;
    at least first and second cladding channels intersecting with said core inlet channel downstream of a core inlet, and;
    at least first and second outlet channels coupled to said core inlet channel and downstream of said cladding channels;
    an optical source providing an optical signal aligned with said core inlet channel;
    a waveguiding fluid supplied to said core inlet at an inlet flow rate;
    a cladding fluid selectively supplied to said cladding channels, wherein said waveguiding fluid and said cladding fluid form an optical waveguide operable to transmit said optical signal; and
    wherein a flow rate of said cladding fluid supplied to at least said first cladding channels is selectable to switch said optical waveguide between at least said first and second outlet channels.

12. The switchable microfluidic optical waveguide system, as claimed in claim 11, wherein said waveguiding fluid has a higher index of refraction than said cladding fluid.

13. The switchable microfluidic optical waveguide system, as claimed in claim 11, wherein said microfluidic structure comprises poly(dimethylsiloxane) (PDMS).

14. The switchable microfluidic optical waveguide system, as claimed in claim 11, further comprising a pump operably interconnected with said first cladding channel and capable of supplying cladding fluid to said first cladding channel at variable flow rates.

15. The switchable microfluidic optical waveguide system, as claimed in claim 14, further comprising a controller operably interconnected with said pump and capable of controlling said pump to switch said optical waveguide between at least said first and second outlet channels.

16. The switchable microfluidic optical waveguide system, as claimed in claim 15, further comprising an optical detector located in proximity to one of said outlet channels and operable to detect said optical signal and generate an electrical signal in response thereto.

17. The switchable microfluidic optical waveguide system, as claimed in claim 16, wherein said controller is further capable of receiving said electrical signal from said optical detector and adjusting said pump in response thereto.

18. A method for switching an output of a microfluidic waveguide, comprising:
- supplying a waveguiding fluid to an inlet of a core fluid channel;
- supplying a cladding fluid to a first cladding channel that intersects said core fluid channel downstream of said inlet at a first flow rate;
- supplying the cladding fluid to a second cladding channel that intersects said core fluid channel downstream of said inlet at a second flow rate, wherein an interaction of said cladding fluid and said waveguiding fluid creates an optical waveguide; and
- adjusting at least one of said first and second flow rates to switch said optical waveguide between at least a first and a second outlet channel.

19. The method, as claimed in claim 18, wherein the cladding fluid has a lower index of refraction relative to the waveguiding fluid.

\* \* \* \* \*

UNITED STATES PATENT AND TRADEMARK OFFICE
CERTIFICATE OF CORRECTION

PATENT NO.       : 7,155,082 B2
APPLICATION NO.  : 10/907695
DATED            : December 26, 2006
INVENTOR(S)      : Oakey et al.

It is certified that error appears in the above-identified patent and that said Letters Patent is hereby corrected as shown below:

Title page, after Abstract paragraph, item 57 (after item 57) delete "19 Claims, 6 Drawing Sheets", and insert --20 Claims, 6 Drawing Sheets--;

Column 6, line 45, delete "$X/W_{total}$", and insert --$x/w_{Total}$--; and

Column 10, after Claim 19, insert --20. The method, as claimed in claim 18, wherein the cladding fluid has a lower viscosity relative to the waveguiding fluid.--.

Signed and Sealed this

Sixth Day of March, 2007

JON W. DUDAS
*Director of the United States Patent and Trademark Office*